April 27, 1943.　　　　M. LEVINE　　　　2,317,782
SYSTEM AND METHOD OF TREATING SEWAGE OR OTHER WASTE MATERIALS
Filed Feb. 6, 1940　　　　2 Sheets-Sheet 1

INVENTOR.
Max Levine,
BY
Davis, Lindsey, Smith & Shonts
ATTORNEYS.

Patented Apr. 27, 1943

2,317,782

UNITED STATES PATENT OFFICE 2,317,782

SYSTEM AND METHOD OF TREATING SEWAGE OR OTHER WASTE MATERIALS

Max Levine, Ames, Iowa, assignor to Iowa State College Research Foundation, Ames, Iowa, a corporation of Iowa Application February 6, 1940, Serial No. 317,570

20 Claims. (Cl. 210—7)

My invention relates to the treatment of sewage or other waste material by subjecting it to the action of a biological trickling filter, and it has to do particularly with maintenance of the filter in a biological as well as physical condition for proper filtration.

As is well known, a trickling filter includes a bed of filtering media or aggregate between which form numerous passages through and along which the material to be filtered trickles. In the passage of the sewage material through this bed a film forms on the bed material and this film as the filter is continued in operation, is continuously built up, one film upon another, until the passageways between the filter bed material become choked or sufficiently blocked to clog the filter. The clogging materials are of a biological or organic nature, being developed either through biological action or through mechanical action of the filter aggregate on the colloidal and finely suspended constituents of the sewage, with the result that these constituents are transformed into slimy, suspended matter that adheres to the material of the filter bed and forms the film above mentioned. It will be appreciated that an ideal filter operating condition exists when a fully effective film of minimum depth covers the filter bed material leaving the passageways between such material open for free trickle movement of the material to be filtered therethrough and along the film surfaces.

When the clogging action above referred to exists, as indicated by pooling on the surface of the filter bed, the efficiency of the filter is lowered to such an extent that proper operation requires that film formed on the filter aggregate be removed, or at least a sufficient amount of such film be removed, to restore the filter bed to its free trickle condition.

Various means have been employed in prior systems for removing the film. For example, one practice has been to put the filter out of service for a considerable period of time, such as a week to ten days, to allow the film to dry up and break away from the filter aggregate. In that case, when the filter is put back in operation, the dried up film will slough off through the filter and be discharged with the effluent. This removes so much of the film that it requires a period of time for the filter to be brought back up to its proper efficient operation. In other instances, the clogging condition has heretofore been taken care of by reducing the quantity of sewage material applied to the filter, allowing the organisms within the filter to gradually destroy the excess film. This means necessitates inclusion in the sewage plant of considerable stand-by capacity in the various units, thereby necessarily increasing considerably the cost of the treatment plant. It has also been customary to take care of the clogging condition by adding to the applied material to be filtered heavy doses of chemicals, such as chlorine, to destroy the organisms in the filter film, in which case the film will disintegrate and slough off with the effluent from the filter. This chemical application is necessarily very costly.

Also, in a few instances attempts have been made with respect to fine-grained filters to take care of the clogging condition by backwashing. However, this prior method has not served the intended purpose because of its limitation to fine-grained filters and because of the delay in use of the filter due to the length of the cutout periods and the length of time required for proper conditioning of the filter after the washing operation. In some such instances air has been applied with a washing fluid, but the application of air has not been of continuous character and such application of air has necessarily resulted in the formation of air pockets and other air-binding conditions which delay the operation of the filter. Furthermore, such prior methods have been of such character as to either remove substantially all of the film formed on the filter aggregate or to insufficiently remove the same, thereby causing considerable inconvenience, in either instance, in the use of the filter because of the frequency with which the filter must be cut out of operation.

One of the objects of my invention is to eliminate the foregoing deficiencies of prior filter systems. My invention overcomes the foregoing difficulties by providing a sewage filter system arranged for washing in such a way that the filter may be properly and efficiently washed within a very few minutes (five to ten minutes) and once the filter has been washed it will operate with a high degree of efficiency for a substantially long period of time (for example from two to four weeks) without clogging and requiring washing.

Hence, another object of my invention is to provide an improved sewage filter system which may be operated more economically and with a higher degree of efficiency than prior sewage filter systems.

Still another object is to provide an improved sewage filter system including a washable filconstructed and arranged for easy and quick washing, thereby reducing the length of the cut-out periods of the filter to the very minimum so that not only the installation cost of the sewage system as a whole may be reduced by reducing required filter area but the cost of operation of the structure after installed is also reduced to the very minimum.

A further object is to provide a sewage filter system including means for backwashing a trickling filter by the utilization of any available liquid, such, for example, as pure water, partially purified sewage or final sewage effluent.

An additional object is to provide a sewage filter system including a coarse-grained filter bed through which the material to be filtered is passed for primary filtration purposes, which filter has associated therewith means for backwashing the same at selected intervals to maintain a high degree of operating efficiency therefor.

Another object is to provide an improved manner of backwashing a biological filter of the trickling type.

Still another object is to provide for the washing of filters in such a manner that substantially only the excess film deposit upon the filter bed aggregate is removed, and this is done without impairing the purification efficiency of the film deposited directly upon the filter bed aggregate. In this way, excess clogging materials are removed without disturbing or impairing the biological functioning of the filter, whereby the operation of the filter may be resumed with maximum filtering efficiency immediately following the washing operation.

Other objects are to provide a method of washing a trickling filter in which the formation of air pockets or other air binding conditions is entirely avoided so that the washed filter bed is, immediately after washing, in condition to perform its intended biological functioning with the highest degree of efficiency; to provide a method of washing a trickling filter wherein air is applied to the washing liquid to the end of the washing period and substantially throughout the filter area being washed, the arrangement being such that this is accomplished without the formation of air pockets or any air binding conditions which would prevent proper washing of any portion of the filter bed or would prevent proper filtration through any part of the washed filter bed immediately after washing; to provide for washing the filter bed in such a manner that the filter will operate a much longer period of time before clogging again results; to provide a filter system in which the filter washing operation is a component part thereof, to the end that the system including the filter may be operated in a substantially continuous manner, thereby greatly reducing operating costs; to provide a filter washing system which permits the use of coarse-grained filters with a higher degree of efficiency and which permits the use of a filter of considerable depth by insuring proper washing of the filter throughout the depth of the same; to provide a filter washing system by which clogging materials may be removed at all depths of the filter bed; and to provide for washing a filter by flowing a washing liquid and air backwardly therethrough under such pressure as to remove the excess film without removing or destroying the biological efficiency of that part of the film that adheres directly to the filter media or aggregate.

Other objects and advantages will become apparent as this description progresses and by reference to the drawings wherein—

Figure 1:
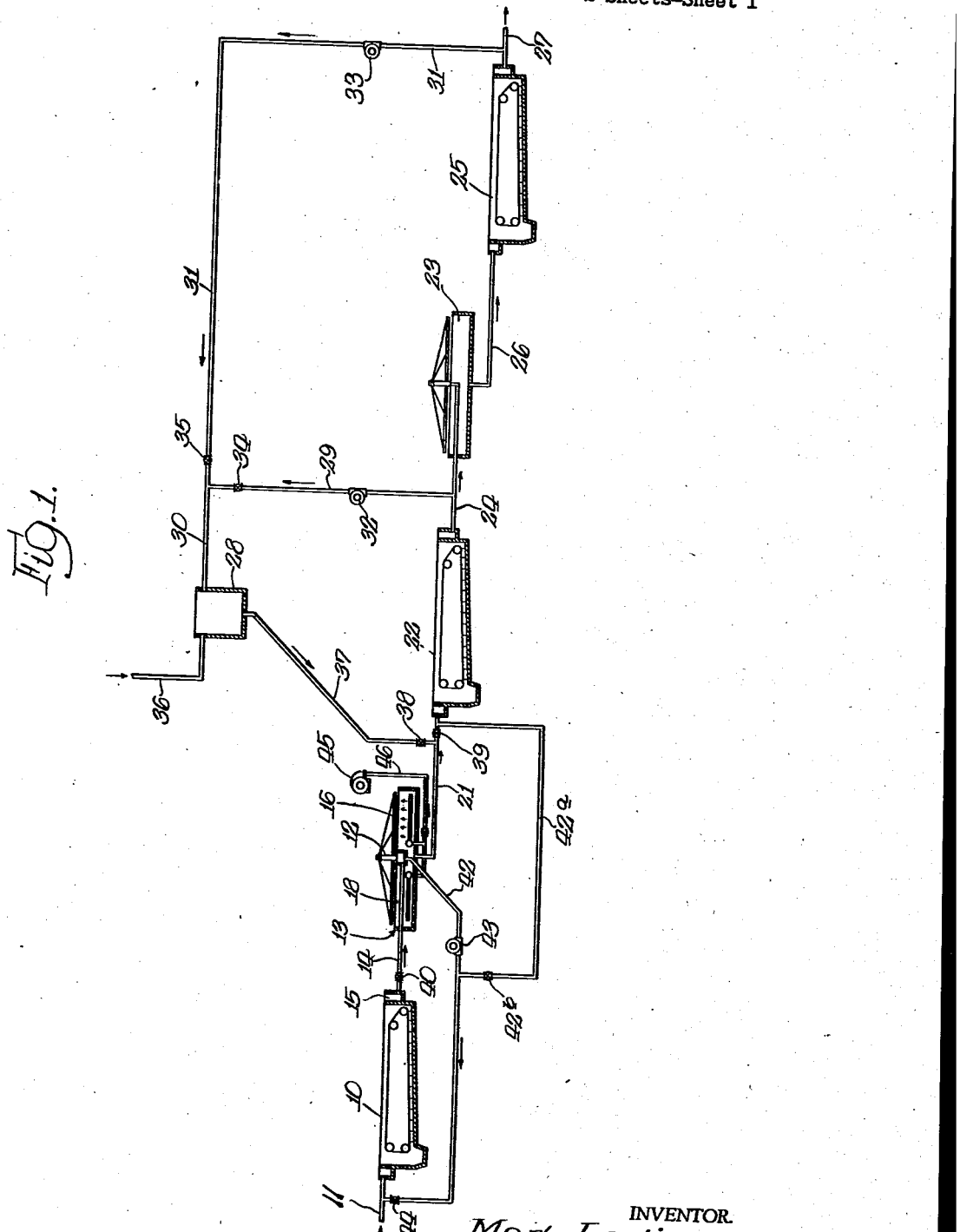
Figure 1 is a flow diagram illustrating diagrammatically one form of sewage filtering system embodying my invention.

Filter washing in the manner of my invention is particularly useful in connection with a sewage filtering system employing a plurality of trickling filters as more particularly disclosed in my co-pending application Serial No. 192,685, filed February 26, 1938. It is to be understood though that my invention is adaptable to any biological filter system, including one or more filters, where similar operating conditions are to be met. In a system such as disclosed in my aforesaid application, the sewage material to be filtered is passed from a source to a primary settling zone and the effluent thereof is fed at a high rate of application to a comparatively deep primary filter zone in which the material is fed through a coarse-grained filter aggregate or media. The effluent from the primary filter zone is fed to an intermediate settling zone, the effluent of which is fed at a reduced rate of application to a secondary trickling filter zone where it is passed preferably through a finer-grained (although it may be the same size) filter aggregate or media than employed for the primary filter zone. The effluent from the secondary filter zone is passed to a final settling tank from which the effluent thereof is discharged to a point of final disposal.

The operation of the foregoing system may be carried out in a continuous or nearly continuous manner by periodically washing the primary filter in the manner of my invention. More particularly, in the operation of the foregoing system the biolgicial film above referred to is formed and it serves the intended purification purpose. As the filtering action is continued, the film is gradually increased in thickness, one film building upon the other, until eventually the entire film body becomes so thick that the passageways formed between the filter media, and through which the material trickles, are clogged, thereby impairing the filtering efficiency of the filter and rendering it practically useless for the purpose intended. This condition, as evidenced by pooling, is cured by backwashing the filter bed in such a manner that the excess film material is removed, leaving the filter media covered with a film of high purification efficiency, which is that film portion directly adhering to the filter media. Backwashing, in accordance with my invention, is accomplished by flowing a liquid, which may be pure water, partly purified sewage material or purified sewage effluent, backwardly through the backwardly and the washing material overflows the filter bed at the top thereof where, as waste water serves as a flotation medium for carrying filter bed and at the same time applying air to water, it is carried away. The agitation caused by the admission of air and water causes the film removal, the air and water being forced through the filter at a pressure sufficient to remove only the area being washed. This flow floods the filter excess and not the entire film surface; and the away the removed film in suspension. This action may be accomplished in the manner stated since it appears that the film material has greater adherence to the filter media than to itself—particularly since the wash water and air are fed at a rate of pressure insufficient for removal of the directly adhering film. Also, in some instances, where sewage material is continuously applied or dosed to the filters, the washing operation may be carried out with good results without stopping the flow of sewage to the filters or without cutting the filters out of operation. This operation is facilitated by the combined action of the air and water during washing and the short time required for washing.

The waste water material used in washing the filter is delivered from the filter along with the suspended film matter back to the sewage source so that it is passed through the primary settling tank for primary removal purposes as will be well understood. In some instances, the primary settling tank may be by-passed in this return, the material, however, being fed to the primary filter for purification purposes. In other instances the waste wash water may be fed directly to the secondary settling zone or even to the final settling zone for purification or other treatment, dependent upon the character of the material and the treatment required for final disposal purposes.

In carrying out the washing operation, I preferably provide a wash water supply zone which is connected through suitable control means with the primary filter effluent channel, this wash water zone being supplied with material of the character above referred to. The wash water may be pure water or clarified effluent from one of the filter zones. In some cases even raw sewage may be employed with good results. Also, in some instances, the wash water may be supplied directly from its source as by pumping, thereby eliminating the wash water storage zone. In either event, the washing operation is of such character that it may preferably be carried out in an ordinary filter within a period of from five to ten minutes' time, the speed of washing being facilitated by the character of the filter media and the simultaneous and continued application of air and water at a predetermined pressure. Air and water are, preferably, applied simultaneously throughout the entire time that the filter is being washed. In carrying out the washing as above explained, the filter is thoroughly washed throughout its entire depth so that it will operate when next placed in filtering operation with maximum efficiency. This efficiency is insured due to the fact that the way has been cleared for the material to be filtered to trickle freely and at the same time to contact the remaining biological film for maximum purification. The foregoing arrangement also insures that the filter may be placed in operation immediately after the washing operation with maximum filtering efficiency and without waiting for reconditioning of the filter biologically. In other words, by washing the filter in the manner taught by my invention, the washing operation may be complete and thorough without disturbing or in any way impairing the intended filtering efficiency of the filter by way of entirely removing the film or by the formation of air pockets which would prevent either proper washing of the air-pocketed portion of the filter or proper filtration of the material through that portion of the filter.

It is to be understood that in some instances the secondary filter zone may also have washing facilities. It is to be further understood that while I preferably employ the double-filtration system above referred to, an additional number of filters may be employed in series or in parallel, all with washing facilities in accordance with my invention, without departing from my invention.

Referring particularly to the drawings disclosing one application of my invention, I may employ a settling tank 10 of customary form which is connected by a suitable conduit 11 to a source of raw sewage to be filtered. The settling tank 10 is connected to the rotary distributor structure 12 of a primary filter 13 by a conduit 14. The conduit 14 leads from an effluent discharge 15 associated with the settling tank 10, and the flow of the material through the conduit 14 may be controlled in any desired and well-known manner so as to deliver the settling tank effluent to the filter 13 at a desired rate of application. The distributor 12, which receives the material from the conduit 14, takes the form of a rotatable unit having a plurality of hollow distributor arms 16 with discharge nozzles 17 through which the material delivered through the conduit 14 is discharged upon the top of a filter bed 18 which may consist of any suitable stone, such, for example, as crushed granite varying in size from 1½" to 4" in screened size. The rotary distributor shown is of the reactionary type, rotatable under the influence of the sewage material, but it is to be understood that any other desired form of distributor means may equally well be employed. The material discharged from the distributor arms 16 trickles downwardly through the filter bed to an underdrain structure 19 and is collected in an effluent collection gallery 20 which is connected by a suitable conduit 21 to an intermediate settling tank 22 similar to the primary settling tank 10. As the filtering material passes downwardly through the bed 18 of the filter 13 and in contact with the biological film heretofore mentioned, a purification action, as is well known, takes place. For example, assuming that the primary filter is dosed at a rate of approximately 20 million gallons per acre per day of normal sewage, a filter of the foregoing character and having a bed formed of approximately 1½" crushed granite material will remove from 3,000 to 8,000 lbs. of B. O. D. per acre foot per day, whereby, by the time the material has passed through the primary filter and has been settled by the intermediate settling tank 22, from 40 per cent to 60 per cent of its B. O. D. has been removed.

The intermediate settling tank 22 has its effluent connected to a secondary filter 23 through a conduit 24. The feed of this effluent to the secondary filter 23 may be controlled similarly to the feed from the primary settling tank to the primary filter but at a reduced rate of application. Also, the filter 23 may be the same as the filter 13 except that its bed is preferably formed of a finer-grained filtering media and it is preferably dosed at a slower rate than the primary filter. If desired, however, in certain instances, the same size filter media may be employed in the secondary filter as in the primary filter. The effluent collection gallery or discharge means of the secondary filter 23 is connected to a final settling tank 25 by a conduit 26. The effluent from the settling tank 25 is discharged to a point of final disposal through a conduit 27. The settling tanks and filters above described may be located at the relative levels illustrated in the drawings for gravity flow of materials, but not necessarily so, if desired controls (pumps, etc.), for handling the materials at other levels are employed.

In order to quickly wash the primary filter 13 for the purpose of attaining the advantages of my invention, I preferably employ a wash water tank 28 located, preferably, at a higher level than the primary filter 13 and the other parts of the system described. However, as stated above, good results may be attained in some instances by dispensing with the tank 28 and pumping wash water directly to the filter from the wash water source during the washing period. The wash water tank 28 is adapted to receive a washing fluid of desired kind and, as shown in the drawings, I preferably employ either the effluent from the intermediate settling tank 22 or the effluent from the final settling tank 25 for this purpose. To that end, the upper part of the wash water tank 28 is connected by a series of conduits 29 and 30 with the conduit 24. The wash water tank 28 is further connected with the final discharge conduit 27 by a conduit 31 and the conduit 30. Material from the conduit 24 is forced into the wash water tank 28 by a pump 32 located in the conduit 29 and the material from the final conduit 27 is forced into the wash water tank 28 by a pump 33 located in the conduit 31. Valves 34 and 35 are disposed in the conduits 29 and 31, respectively, so that when the pump 32 is in operation, delivering material from the conduit 24 into the wash water tank 28, the valve 34 is open and the valve 35 is closed, preventing such material from being directed into the conduit 31 and the final discharge conduit 27; and, when the pump 33 is delivering material from the conduit 27, the valve 34 is closed and the valve 35 opened so that such material will not enter the conduit 29. If desired, pure water may be delivered to the wash water tank 28 through a conduit 36 from any suitable source (not shown). In that case, the valves 34 and 35 may be closed so that the water will not enter the conduits 29 and 31.

The pumps 32 and 33 may take any well-known form of electrically driven pump and the cutting in and out of these pumps may be either manually controlled or electrically controlled by suitable float means (not shown) associated with the wash water tank 28, the arrangement being such, as is well known, that when the level of the wash water rises to a certain point in the tank 28, suitable switch means will be actuated to open the electric circuits to the pumps 32 and 33.

The wash water tank 28 is connected with the primary filter effluent conduit 21 by a conduit 37 in which is located a valve 38. The valve 38 is normally closed; however, when the filter 13 is to be washed, the valve 38 is opened and a valve 39, located in the conduit 21 between the intermediate settling tank 22 and the connection with the conduit 27, is closed so that the wash water material will not enter the intermediate settling tank.

When the washing operation is carried on with the valve 38 open and the valve 39 closed, the flow of material from the settling tank 10 to the primary filter 13 is cut off in any suitable manner, as by closing a valve 40 between this settling tank and the filter 13, so that the filter bed and the filter effluent collection gallery 20 and the conduit 21 are substantially freed of the filter effluent. When the valve 38 is opened, the wash water from the wash water tank 28 flows by gravity backwardly through the conduit 21 into the effluent collection gallery of the filter 13 and thence upwardly through the bed of filtering material. I have found that the quantity of wash water required per wash is, for a filter of the character above mentioned, approximately 3½ gallons per sq. foot of filter area per minute, and that a sufficient head pressure is provided by mounting the tank 28 between 3 and 5 feet above the top of the filter bed 18. This wash water floods, so to speak, the filter bed throughout and overflows the top thereof. This is true whether the washing operation is carried on with the filter cut out as above described or whether it is carried on while the filter is being fed, as in continuous filter operation. When the wash water reaches a predetermined level slightly above the top of the sewage bed 18, it overflows into an overflow trough 41 (Figs. 2 and 3) extending transversely and diametrically of the filter 13, which trough is connected with a conduit 42 leading back to the sewage inlet conduit 11. A pump 43 is disposed in the conduit 42 for forcing this material at a predetermined rate and pressure into the sewage inlet conduit 11, a valve 44 in the conduit 42 being opened at that time to permit such movement of the waste wash water. The valve 44 is closed at other times when the filtering operation is being carried on. In this way the wash water waste is delivered back for retreatment in the primary settling tank 10 and for repassage through the primary filter 13 and the remainder of the system to the point of disposal. It may be preferable in some instances, however, to feed the waste wash water from the overflow trough directly to the intermediate settling tank 22 instead of the primary tank 10. In that case, the waste water conduit 42 would be connected to the inlet tank 22 by a branch connection 42a. When the flow is through the branch 42a, the branch valve 42b is open and the valve 44 is closed. The valve 42b is closed and the valve 44 opened when the flow is to the tank 10.

Figure 2:
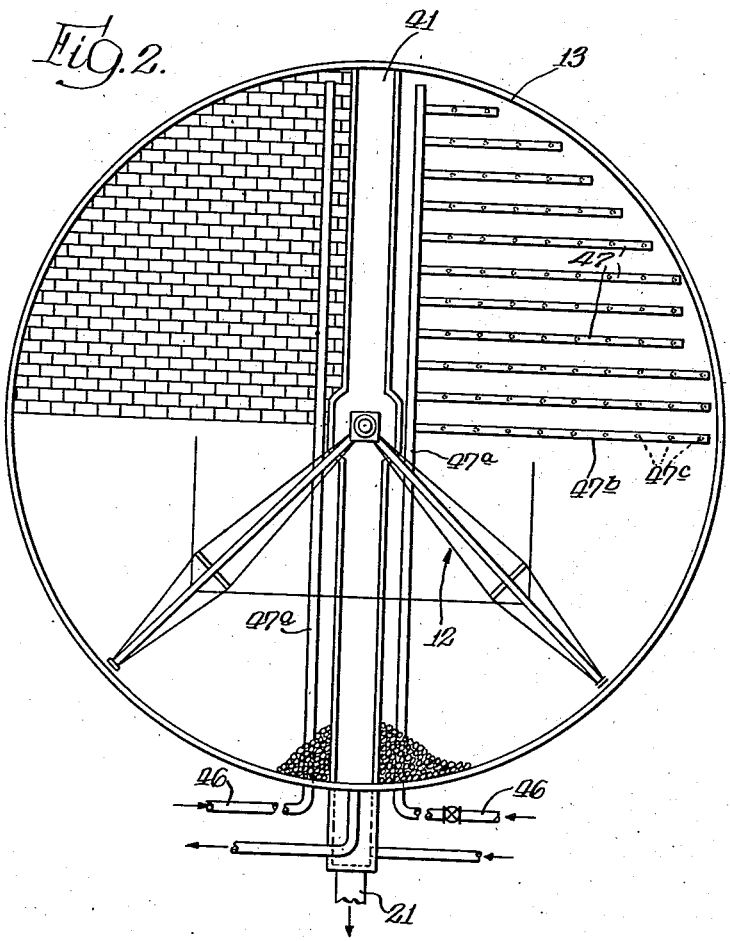
Fig. 2 is a top plan view of the primary filter structure illustrated in Fig. 1, certain portions thereof being shown removed to better illustrate the lower portion of the filter.
Figure 3:
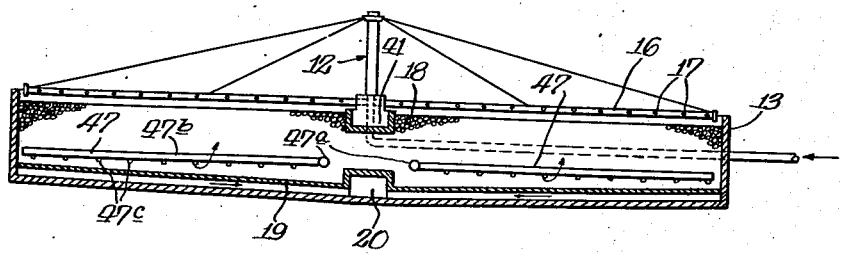
Fig. 3 is a vertical sectional view illustrating somewhat diagrammatically the structure shown in Fig. 2.

The hereinabove mentioned advantages of my invention are attained in part by forcing air through the filter bed simultaneously with the passage of the water therethrough. I, preferably, initially admit the air and water at the same time and, preferably, apply the air continuously throughout the washing operation and at all times during the application of the wash water to the filter bed. However, in some instances, it may first be desirable to preliminarily fill the filter bed with the wash water and then apply the air, the air being thereafter applied continuously throughout the entire washing operation. The air for the foregoing purpose, as illustrated in the drawings, is supplied by a suitably controlled air compressor 45 (Fig. 1) connected by a conduit 46 with a pipe grillage 47 (Figs. 2 and 3). This pipe grillage takes the form of a pair of header pipes 47a with branches 47b having orifices 47c. I have found that the use of a grillage consisting of pipe 1½" in diameter with the branches spaced apart approximately eighteen inches and having approximately ⅜" orifices spaced apart approximately eighteen inches will serve my purpose in washing a filter of the character above referred to. The capacity of the blower or compressor 45 may be varied and I have found that, for washing a filter structure of the character above mentioned, a compressor supplying air at approximately ¾ of a cubic ft.

per minute per sq. foot of filter area well serves my purpose.

I believe that the operation and advantages of my invention will be appreciated from the foregoing description. In the operation of the system shown, the primary filter may serve a flocculation and an ammonification purpose, and the secondary filter may perform a nitrification function, as set forth in said prior pending application.

The washing operation is accomplished in the very short time of from five to ten minutes for a filter of the character mentioned above. In the washing operation, excess film material is removed and floated to the top of the filter bed with the wash water where it is carried away by the water overflowing into the trough 41. As soon as the washing operation is completed, as indicated by the amount of suspended film matter in the wash water delivered to the trough 41, the wash water is cut off by closing the valve 38 and opening the valve 39 leading to the settling tank 32. The valve 40 between the primary settling tank and the primary filter 13 is opened, permitting resumption of the filtering operation immediately following the washing operation. Of course, if the filter is fed with sewage while the washing operation is carried on, then suitable connections are provided for the wash water which do not interfere with the normal flow of sewage, as will be well understood. In this way the primary filter is maintained substantially continuously in a maximum working condition so that by the time the material has passed through the entire system it has reached the point of maximum purification in a system of this character and is ready for final disposal.

A system of the foregoing character eliminates the necessity of additional filtering area. The washing operation is so complete that the filter will not clog up for a comparatively long time, experience having shown that the filter will operate efficiently after such washing for a period of from two to four weeks. The filtering operation may be carried on immediately after the washing operation. This renders the operation substantially continuous as compared to the operation of prior systems, this being due to the fact that the washing operation may be carried out under my invention without disturbing or impairing the purifying efficiency of the filter media, in fact, greatly increasing such efficiency. All of these features result in much cheaper operating cost, much cheaper initial installation cost, much cheaper maintenance and upkeep cost and, as a whole, a much higher efficiency in the filtering operation.

It is to be understood that while I have shown only one system for carrying out my invention, changes in detail arrangements of the associated parts may be made without departing from the spirit and scope of my invention. For example, in some instances it may be desirable to utilize the wash water tank as a retention tank for holding raw sewage during excess flow periods, which excess material may be utilized to supplement flows at the lower flow periods in order to maintain a substantially constant rate of application. If that is desired, the inlet conduit 11 may be connected to the wash water tank with a conduit and it may have a pump therein for pumping raw sewage directly into the wash water tank; or the effluent from the settling tank 10 may be connected by suitable pump and conduit means directly with the wash water tank so that such effluent may be stored therein during excess flow periods. These conduits may be so arranged that the material in the tank 27 may be drawn therefrom to replenish flows to the tank 10 or to supplement the effluent from the tank 10 flowing from the primary filter 13. In either of these events the material fed to the wash water tank may be utilized for washing purposes, the material so used being fed backwardly through the primary filter at such a rate and along with the air at such a pressure that it accomplishes a washing action by removing the excess film deposits, leaving a highly efficient non-clogging film for immediate purification purposes.

I claim:

1. The method of conditioning a trickling filter having a filter bed formed of a coarse-grained aggregate, by removal of excess biological film deposited thereon during operation of said filter in order that it may continue to perform its intended biological and mechanical functions, which comprises the steps of cutting off from said filter the flow of material to be filtered, feeding a washing fluid backwardly through said filter at such a rate and in sufficient quantity to continuously overflow the filter bed at the top thereof, continuously applying air uniformly throughout said filter bed simultaneously and continuously with the feed of the washing liquid thereto and under a pressure sufficient to remove the excess biological film without disturbing the filtering aggregate, and continuously withdrawing the overflowing liquid, and matter suspended therein, from the top of the filter bed throughout the washing operation.

2. The method of washing a trickling filter bed formed of a coarse-grained media having an excess biological film which has been deposited thereon during operation of the filter, which includes the steps of collecting and storing the material after it has passed through and beyond the filter bed in a wash water zone, stopping the flow of material to be filtered to the filter zone and thereafter feeding the wash water from said wash water zone reversely through said filter zone in such a manner as to flood the entire filter bed and to overflow the filter bed at the top thereof, feeding air to the bottom of said filter bed and upwardly therethrough throughout the same simultaneously with the feed of wash water and continuously so long as the wash water is being fed under a pressure sufficient to remove the excess biological film without disturbance of the filtering media, and delivering the waste wash water overflowing at the top of the filter zone back to a point from which it is passed through the filter zone when the operation of the filter is again resumed.

3. The method of filtering sewage or other waste material, which comprises the steps of feeding unfiltered material through a zone wherein it is subjected to the purification action of the biological film deposited on the coarse-grained filter media of a trickling filter, said material being fed to said filter zone continuously until the biological film of the latter builds up to a point causing clogging, then stopping the flow of material to said filter zone, then feeding a wash water backwardly through said filter zone in sufficient quantity to overflow said filter zone at the top thereof, feeding air to said filter bed simultaneously with and throughout the feed of water thereto, said air and water being fed at a rate and pressure sufficient to remove only the excess portion of said film without disturbing the filtering media and leaving the film adhering directly to the filter media substantially intact, said removed film being carried by flotation in said water to the top of said filter zone, and discharging the overflow of water and film material at the top of said filter zone to a point of disposal.

4. The method of filtering sewage or the like material, which comprises the steps of passing the material through a zone in which it is subjected to the action of a trickling filter, passing the effluent from said filter to a settling zone, passing the effluent from said settling zone to another zone in which it is subjected to the action of a trickling filter, passing the effluent from said second filter to a final settling zone, maintaining the biological and mechanical functions of said first filter zone by periodically stopping the flow of said material to said first filter zone, then feeding wash water in the form of precollected effluent from said first settling zone backwardly through said first filter zone overflowing the top thereof, applying air simultaneously with the feed of the wash water, and discharging the overflowing material at the top of the first filter zone to a point of disposal.

5. The method of filtering sewage or the like material, which comprises the steps of passing the material through a zone in which it is subjected to the action of a trickling filter, passing the effluent from said filter to a settling zone, passing the effluent from said settling zone to another zone in which it is subjected to the action of a trickling filter, passing the effluent from said second filter to a final settling zone, maintaining the biological and mechanical functions of said first filter zone by periodically stopping the flow of material thereto, then feeding backwardly therethrough precollected effluent from said last-mentioned settling zone, feeding air simultaneously with the feed of said wash water material, and discharging the overflowing materials at the top of the first filter zone to a point of disposal.

6. The method of washing a trickling filter of the type having a filter bed formed of a coarse-grained aggregate, upon the surface of which the material to be filtered forms a biological purification film and between which trickle passages are formed, said film tending to increase in thickness as the sewage material flows therepast and the washing to be carried out without removing all of said film so as to retain the biological functioning of said film, which comprises the steps of stopping the flow through the filter of the material to be filtered when said film has increased in thickness sufficiently to tend to clog the trickle passages, feeding a wash water backwardly through said filter in such quantity and at such a rate to continuously overflow the filter bed at the top thereof for a predetermined period, said water being fed in such a manner as to flood the entire filter bed, applying air under pressure to the filter bed throughout the entire time that the wash water is fed thereto, said air being admitted in such a manner at the bottom of the filter bed as to tend to pass throughout the entire filter bed surface, the air and water being fed under a pressure and for a time sufficient to remove only excess portions of said film without disturbing the filter aggregate and leaving intact the film portions adhering directly to the filter aggregate, and removing the washing fluid and film matter suspended therein from the top of the filter bed to a point of disposal.

7. The method of treating sewage or other waste material for purposes of final disposal, which comprises the steps of feeding unfiltered material to and passing it through a zone wherein it is subjected to the action of a biological purification film of a coarse-grained trickling filter bed, feeding the effluent from said filter zone to a settling zone only, feeding the effluent from said settling zone to another and finer-grained filter zone only, feeding the effluent from said latter filter zone to a final settling zone, feeding the effluent from said final settling zone to a point of disposal, maintaining the biological and mechanical functions of the first-named filter zone by delivering to a storage zone a portion of the material being treated after it has passed beyond the first filter zone, periodically stopping the feed of material to the first filter zone and passing backwardly therethrough liquid from said storage zone, the liquid being supplied in such quantity and at such a rate that it floods the first filter zone and overflows the same at the top thereof, feeding air continuously to the filter bed along with the liquid fed thereto without disturbing the coarse-grained filtering media of said bed, and discharging the overflowing liquid and material suspended therein at the top of the first filter zone to a point of disposal.

8. The method of treating sewage or other waste material for purposes of final disposal, which comprises the steps of feeding unfiltered material to and passing it through a zone wherein it is subjected to the action of a biological purification film of a coarse-grained trickling filter bed, feeding the effluent from said filter zone to a settling zone, feeding the effluent from said settling zone to another and finer-grained filter zone, feeding the effluent from said latter filter zone to a final settling zone, feeding the effluent from said final settling zone to a point of disposal, maintaining the biological and mechanical functions of the first-named filter zone by delivering to a storage zone a portion of the material being treated after it has passed beyond the first filter zone, periodically stopping the feed of material to the first filter zone and passing backwardly therethrough liquid from said storage zone, the liquid being supplied in such quantity and at such a rate that it floods the first filter zone and overflows the same at the top thereof, feeding air continuously to the filter bed along with the liquid fed thereto without disturbing the coarse-grained filtering media of said bed, and feeding the waste liquid and suspended matter therein at the top of the first filter zone back to the unfiltered material for passage through the first filter zone when filtering action is resumed.

9. A system for treating sewage or other waste material which comprise a trickling filter having a filter bed formed of coarse granular material providing trickle passages leading from top to bottom of the bed, means for feeding unfiltered material which comprises a trickling filter having tion that such material trickles through said passages without flooding of the bed, means for cutting out said feeding means and freeing said passages of material to be filtered, means for feeding a washing fluid backwardly through said filter bed while said feed means is cut out and in such quantity as to flood said bed and overflow the top thereof, overflow means for carrying away said overflowing fluid, and means for feeding air to said filter bed substantially throughout the depth thereof and continuously with and throughout the feeding of said washing fluid.

10. A system for treating sewage or other waste material which comprises a trickling filter having a filter bed formed of a coarse-grained material between one and a half inch and four inch screen size providing trickle passageways therethrough and upon which has been deposited a biological purification film which tends to increase in thickness as sewage material flows therepast, means for feeding unfiltered material to said filter bed through which it trickles, means for cutting out said feeding means, means for feeding a washing fluid backwardly through said filter bed when the filter is cut out and in such a manner as to flood said bed throughout and overflow the top thereof, an overflow trough at the top of the filter bed for carrying away said overflowing fluid, and means for feeding air to said filter bed continuously with the feeding of said washing fluid and under a pressure sufficient to remove the excess film without disturbing the coarse-grained material of said bed.

11. A system for treating sewage or other waste material which comprises a trickling primary filter having a bed of coarse granular material through which the material to be filtered trickles, means for supplying unfiltered material to said filter bed, means for feeding the effluent from said primary filter to a settling tank only, means for feeding the effluent from said settling tank to a secondary filter only, means for feeding the effluent from the secondary filter to another settling tank, means for feeding the effluent from said latter settling tank to a point of disposal, and means for eliminating clogging of said primary filter including means for cutting out the primary filter, a wash water storage tank, means for feeding material after it has passed said primary filter to said storage tank for wash water purposes, means for feeding wash water from said wash water tank to the bottom of said filter and backwardly therethrough in such a way as to flood and overflow the same at the top thereof, means for feeding air to the bottom of said primary filter bed simultaneously with the feed of wash water thereto and continuously with the feed of water without disturbing the coarse granular material of said bed, and means at the top of the filter bed for collecting and discharging the overflowing waste wash water to a point of disposal.

12. A system for treating sewage or other waste material which comprises a trickling primary filter having a bed of coarse granular material through which the material to be filtered trickles, means for supplying unfiltered material to said filter bed, a settling tank, means for feeding the effluent from said primary filter to said settling tank, a secondary filter having a granular bed through which the material trickles, means for feeding the effluent from said settling tank to said secondary filter, means for feeding the effluent from the secondary filter to another settling tank, means for feeding the effluent from said latter settling tank to a point of disposal, and means for eliminating clogging of said primary filter including means for cutting out the primary filter, a wash water storage tank, means for feeding the effluent from said latter-mentioned settling tank to said wash water tank for wash water purposes, means for feeding wash water from said wash water tank to the bottom of said primary filter and backwardly therethrough in such a way as to flood and overflow the same at the top thereof, means for feeding air to the bottom of said primary filter bed simultaneously with the feed of wash water thereto and continuously with the feed of water, and means at the top of the filter bed for collecting and discharging the overflowing waste wash water to a point of disposal.

13. A system for treating sewage or other waste material which comprises a trickling primary filter having a bed of coarse granular material through which the material to be filtered trickles, means for supplying unfiltered material to said filter bed, a settling tank, means for feeding the effluent from said primary filter to said settling tank, a secondary filter having a granular bed through which the material trickles, means for feeding the effluent from said settling tank to said secondary filter, means for feeding the effluent from the secondary filter to another settling tank, means for feeding the effluent from said latter settling tank to a point of disposal, and means for eliminating clogging of said primary filter including means for cutting out the primary filter, a wash water storage tank, means for feeding the effluent from said primary filter to said water storage tank for wash water purposes, means for feeding wash water from said wash water tank to the bottom of said primary filter and backwardly therethrough in such a way as to flood and overflow the same at the top thereof, means for feeding air to the bottom of said primary filter bed simultaneously with the feed of wash water thereto and continuously with the feed of water, and means at the top of the filter bed for collecting and discharging the overflowing waste wash water to a point of disposal.

14. The method of treating sewage or other waste material for purposes of final disposal, which comprises the steps of feeding unfiltered material at a high rate of application to and through a zone wherein it is subjected to the agglomerating and biological purification action of a coarse-grained trickling filter bed having a biological purification film formed on the aggregate of the bed of the same, feeding the effluent from said filter zone to a settling zone, feeding the effluent from said settling zone to another filter zone at a lower rate of application than to the first filter zone wherein it is subjected to the biological purification action of a secondary trickling filter, feeding the effluent from said latter filter zone to a final settling zone, feeding the effluent from said final settling zone to a point of disposal, maintaining the biological and mechanical functions of the first-named filter zone by periodically stopping the feeding of material to said first filter zone and passing backwardly therethrough a portion of the material being treated after it has passed beyond the first filter zone, the material being supplied in such quantity and at such a rate that it floods the first filter zone and overflows the same at the top thereof, feeding air continuously to the filter bed along with the other material fed backwardly thereto without disturbing the coarse-grained filtering media of said filter bed, and discharging the overflowing material and matter suspended therein at the top of the first filter zone to a point of disposal.

15. The method of treating sewage or other waste material for purposes of final disposal, which comprises the steps of feeding unfiltered material to and through a zone in which it is subjected to the action of a primary trickling filter, feeding the effluent from said filter zone to an intermediate settling zone, feeding the effluent from said intermediate settling zone to another trickling filter zone, feeding the effluent from said latter filter zone to a final settling zone, feeding the effluent from said final settling zone to a point of disposal, and maintaining the biological and mechanical functions of at least one of said filter zones by stopping the operation of such filter zone, feeding a portion of the effluent from said final settling zone backwardly through the filter zone being washed in such quantity and at such a rate that it floods the filter zone and overflows the same at the top thereof, feeding air continuously to the filter zone along with the washing material fed thereto without disturbing the filter media of said filter zone, and discharging the overflowing liquid and material suspended therein at the top of the filter zone being washed to a point of disposal.

16. The method of treating sewage or other waste material for purposes of final disposal, which comprises the steps of feeding unfiltered material to and through a zone in which it is subjected to the action of a primary trickling filter, feeding the effluent from said filter zone to an intermediate settling zone, feeding the effluent from said intermediate settling zone to another trickling filter zone, feeding the effluent from said latter filter zone to a final settling zone, feeding the effluent from said final settling zone to a point of disposal, maintaining the biological and mechanical functions of at least one of said filter zones by stopping the operation of such zone and washing the same by passing backwardly therethrough a portion of the effluent from said intermediate settling zone in such quantity and at such a rate that it floods the filter zone being washed and overflows the same at the top thereof, feeding air continuously to the filter zone being washed along with the washing material fed thereto without disturbing the filtering media of said filter zone, and discharging the overflowing material and matter suspended therein at the top of the filter zone being washed to a point of disposal.

17. The method of filtering sewage or the like material, which comprises the steps of continuously feeding unfiltered material through a zone wherein it is subjected to the purification action of the biological film deposited on the coarse-grained filtering media of a trickling filter, and maintaining the biological and mechanical functions of such filter zone by periodically washing the same while the sewage feed is continued by feeding a wash water backwardly through the filter zone in sufficient quantity to flood and overflow the filter zone at the top thereof, feeding air to said filter zone simultaneously with and throughout the feed of the wash water thereto, said air and water being fed at a rate and pressure sufficient to offset the flow of sewage material forwardly therethrough and to remove only the excess portion of said film without disturbing the filtering media and leaving only that part of the film adhering directly to the filter media, said removed film being carried by flotation in said water to the top of the filter zone, and discharging the overflow of material and film material at the top of said filter zone to a point of disposal.

18. The method of treating sewage or other waste material for purposes of final disposal, which comprises the steps of continuously feeding unfiltered material to and passing it at a high rate of application through a zone wherein it is subjected to the primary action of a trickling filter, feeding the effluent from said filter zone to a settling zone, feeding the effluent from said settling zone at a reduced rate of application to and through another filter zone where it is subjected to a secondary trickling filter action, feeding the effluent from said latter filter to a final settling zone, feeding the effluent from said final settling zone to a point of disposal, maintaining the biological and mechanical functions of at least one of said filter zones by periodically passing backwardly therethrough wash water material in such quantity and at such a rate that it floods the filter zone being washed and overflows the same at the top thereof along with such material being treated as may then be fed to such filter zone, feeding air continuously to the filter zone being washed along with the washing material fed thereto without disturbing the filter media of said filter zone, and discharging from the washed filter zone the overflowing liquid and matter suspended therein to a point of disposal.

19. The method of treating sewage or other waste material for purposes of final disposal, which comprises the steps of continuously feeding unfiltered material to and passing it through a trickling filter zone, feeding the effluent from said filter zone to a settling zone, feeding the effluent from said settling zone to and through another filter zone, feeding the effluent from said latter filter zone to a final settling zone, feeding the effluent from said final settling zone to a point of disposal, maintaining the biological and mechanical functions of at least one of said filter zones by periodically feeding backwardly therethrough wash water material in such quantity and at such a rate that it floods the filter zone being washed and overflows the same at the top thereof, carrying with it material being fed to the washed filter zone for filtering purposes, feeding air continuously to the washed filter zone along with the washing material without disturbing the filtering media of said zone, and discharging from the washed filter zone the overflowing material and carrying the same back to a point from which it is passed through the washed filter zone for filtering purposes.

20. The method of filtering sewage or the like material, which comprises the steps of passing the material through a zone in which it is subjected to the action of a trickling filter, passing the effluent from said filter to a settling zone, passing the effluent from said settling zone to another zone in which it is subjected to the action of a trickling filter, passing the effluent from said second filter to a final settling zone, maintaining the biological and mechanical functions of said first filter zone by periodically stopping the flow of material thereto, then feeding a washing fluid backwardly therethrough, feeding air simultaneously with the feed of said wash water material, and discharging the overflowing materials at the top of the first filter zone to a point of disposal.

MAX LEVINE.

CERTIFICATE OF CORRECTION.

Patent No. 2,317,782.　　　　　　　　　　　　　　April 27, 1943.

MAX LEVINE.

It is hereby certified that error appears in the printed specification of the above numbered patent requiring correction as follows: Page 6, second column, line 62-63, strike out "which comprises a trickling filter having tion" and insert instead --to said bed at such a rate of application--; line 74, after the word "fluid" and before the period insert --without disturbing the coarse grannular material of said bed--; and that the said Letters Patent should be read with this correction therein that the same may conform to the record of the case in the Patent Office.

Signed and sealed this 8th day of June, A. D. 1943.

(Seal)

Henry Van Arsdale,
Acting Commissioner of Patents.